(12) United States Patent
Meissner et al.

(10) Patent No.: US 11,732,702 B2
(45) Date of Patent: Aug. 22, 2023

(54) DOUBLE-PISTON COMPRESSOR HAVING A SLIDING BLOCK PRODUCING A STROKE CURVE THAT DEVIATES FROM A SINUSOIDAL STROKE CURVE

(71) Applicant: ZF CV Systems Hannover GmbH, Hannover (DE)

(72) Inventors: Frank Meissner, Hannover (DE); Marco Seeger, Langenhagen (DE)

(73) Assignee: ZF CV SYSTEMS EUROPE BV, Brussels (BE)

( * ) Notice: Subject to any disclaimer, the term of this patent is extended or adjusted under 35 U.S.C. 154(b) by 135 days.

(21) Appl. No.: 17/342,556

(22) Filed: Jun. 9, 2021

(65) Prior Publication Data
US 2021/0293229 A1    Sep. 23, 2021

Related U.S. Application Data

(62) Division of application No. 15/763,463, filed as application No. PCT/EP2016/001895 on Nov. 14, 2016, now abandoned.

(30) Foreign Application Priority Data

Dec. 8, 2015    (DE) .................... 10 2015 015 946.1

(51) Int. Cl.
*F04B 25/00* (2006.01)
*F04B 27/02* (2006.01)
(Continued)

(52) U.S. Cl.
CPC .............. *F04B 25/005* (2013.01); *F04B 9/04* (2013.01); *F04B 27/02* (2013.01);
(Continued)

(58) Field of Classification Search
CPC .......................... F04D 27/0428; F04B 27/0428
See application file for complete search history.

(56) References Cited

U.S. PATENT DOCUMENTS

| 999,220 A | 8/1911 | Harmon |
| 1,370,305 A * | 3/1921 | Golle .................... F04B 27/065 74/25 |

(Continued)

FOREIGN PATENT DOCUMENTS

| DE | 918042 C | 9/1954 |
| DE | 1932737 U | 2/1966 |

(Continued)

OTHER PUBLICATIONS

U.S. Appl. No. 15/763,463, filed Mar. 27, 2018.

*Primary Examiner* — Nathan C Zollinger
*Assistant Examiner* — Timothy P Solak
(74) *Attorney, Agent, or Firm* — Leydig, Voit & Mayer, Ltd.

(57) ABSTRACT

A compressor includes a low pressure stage having a low pressure cylinder, a high pressure stage having a high pressure cylinder, a low pressure piston guided in an axially movable manner in the low pressure cylinder, a high pressure piston guided in an axially movable manner in the high pressure cylinder, a piston rod rigidly connecting the low pressure piston and the high pressure piston, and a sliding block guide. The sliding block guide includes a recess arranged in the piston rod and further includes two substantially parallel sliding block tracks. One of the sliding block tracks has an arc-shaped indentation in a central portion. The sliding block tracks are constructed and such that a movement of the low pressure piston and of the high pressure piston follows a piston stroke curve that deviates from a regular sinusoidal stroke curve.

14 Claims, 12 Drawing Sheets

(51) Int. Cl.
*F04B 27/04* (2006.01)
*F04B 53/14* (2006.01)
*F04B 9/04* (2006.01)
*F16H 21/22* (2006.01)
*F04D 25/06* (2006.01)

(52) U.S. Cl.
CPC ........ *F04B 27/0428* (2013.01); *F04B 53/144* (2013.01); *F04D 25/062* (2013.01); *F16H 21/22* (2013.01)

(56) References Cited

U.S. PATENT DOCUMENTS

| | | | | |
|---|---|---|---|---|
| 2,236,853 | A | * | 4/1941 | Herzmark ............... F04B 49/24 417/253 |
| 2,312,057 | A | | 2/1943 | Williams |
| 2,375,748 | A | * | 5/1945 | Broyles .................. F16H 21/18 74/50 |
| 3,451,276 | A | * | 6/1969 | Wadlow ................. F16H 21/36 74/50 |
| 3,459,056 | A | | 8/1969 | Lea |
| 4,078,439 | A | * | 3/1978 | Iturriaga-Notario .... F04B 27/02 123/197.1 |
| 4,330,992 | A | | 5/1982 | Senft |
| 4,584,972 | A | | 4/1986 | Anderson et al. |
| 4,779,472 | A | | 10/1988 | Brackett |
| 5,030,065 | A | | 7/1991 | Baumann |
| 5,033,940 | A | | 7/1991 | Baumann |
| 5,529,467 | A | | 6/1996 | Rometsch |
| 7,650,870 | B2 | * | 1/2010 | Fisher ................. F04B 27/0404 123/197.4 |
| 2002/0002957 | A1 | * | 1/2002 | Moteki ................. F02B 75/045 123/48 B |
| 2004/0228737 | A1 | | 11/2004 | Folchert |
| 2013/0276527 | A1 | | 10/2013 | Hakansson et al. |

FOREIGN PATENT DOCUMENTS

| | | |
|---|---|---|
| DE | 4433068 C2 | 5/1998 |
| DE | 19715291 A1 | 10/1998 |
| DE | 10321771 B4 | 2/2011 |
| DE | 102012223114 A1 | 6/2014 |
| EP | 0389414 B1 | 6/1993 |

\* cited by examiner

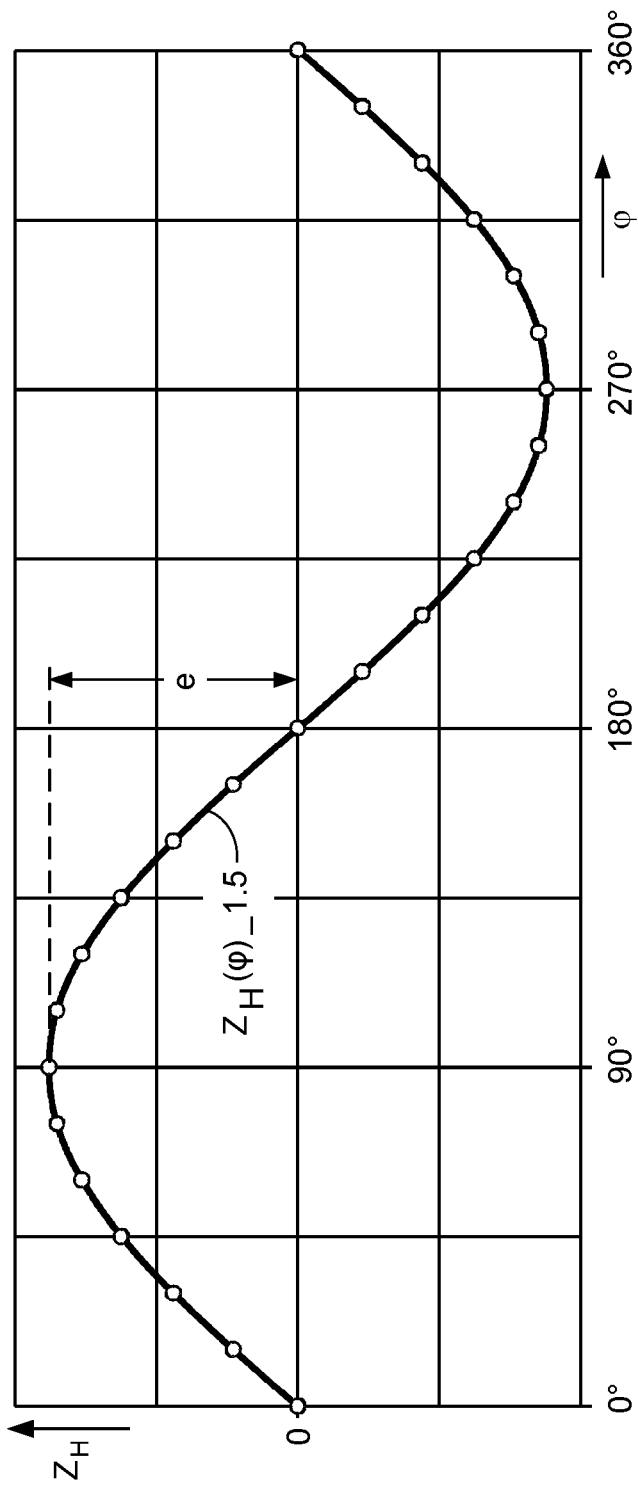

DOUBLE-PISTON COMPRESSOR HAVING A SLIDING BLOCK PRODUCING A STROKE CURVE THAT DEVIATES FROM A SINUSOIDAL STROKE CURVE

CROSS REFERENCE TO RELATED APPLICATIONS

This application is a divisional of U.S. patent application Ser. No. 15/763,463, now abandoned, which is a U.S. National Stage Application under 35 U.S.C. § 371 of International Application No. PCT/EP2016/001895, which was filed on Nov. 14, 2016, and claims benefit to German Patent Application No. DE 10 2015 015 946.1, which was filed on Dec. 8, 2015. The International Application was published in German on Jun. 15, 2017 as WO 2017/097393 A1 under PCT Article 21(2).

FIELD

The invention relates to a double-piston compressor of a compressed air supply device.

BACKGROUND

Double-piston compressors having two pistons which are rigidly connected to one another via a piston rod and are guided in an axially movable manner in cylinders arranged radially opposite with respect to the axis of rotation of a drive shaft have long been known in embodiments which differ in terms of their drive technology.

In one type of double-piston compressor which is known for example from DE 103 21 771 B4, the piston rod is drivingly connected to the drive shaft via a con rod. The con rod is connected in an articulated manner to the drive shaft and the piston rod, on the one hand via a crank pin, which engages in a first end-side bore and is secured eccentrically on the drive shaft, and on the other hand via a drive pin which engages in a second end-side bore and is secured off-center on the piston rod.

In contrast, in a substantially simpler and more space-saving design of a double-piston compressor, the piston rod is drivingly connected to the drive shaft merely via a sliding block guide. The sliding block guide comprises a recess, which is constructed in the piston rod, is provided with two parallel sliding block tracks and is aligned perpendicularly to the axis of rotation of the drive shaft, and a drive element, which is in engagement with the recess and is eccentrically secured on the drive shaft such that it is axially parallel with respect to the axis of rotation of the drive shaft. Depending on the resultant force direction of the pressure forces acting on the two pistons, the drive element abuts against one of the two sliding block tracks and, bridging the clearance which is inevitably present in the sliding block guide, moves to abut against the other sliding block track when the resultant force direction is reversed. The recess in the piston rod can be constructed in a U shape, as is known for example from DE 918 042 B. In this case, the side walls of the recess form the parallel sliding block tracks and the two parts of the piston rod are connected to one another via the base wall of the recess.

As an alternative to this, the recess can be constructed as a slot-shaped through opening, as is known for example from FIG. 8 of DE 44 33 068 C2 and DE 10 2012 223 114 A1. In this case, the side walls of the recess form the parallel sliding block tracks. To connect the two parts of the piston rod, end-side webs are required in this embodiment of the sliding block guide, which are usually designed in the shape of a circular arc but, with an appropriate spacing, can also be designed linearly. The drive element can be a crank pin, which is eccentrically secured on the drive shaft such that it is axially parallel with respect to the axis of rotation of the drive shaft and which, as is known for example from FIG. 8 of DE 44 33 068 C2, is guided in a directly slideable manner on the parallel sliding block tracks of the sliding block guide.

To reduce the driving resistance and the wear on the sliding block tracks, the driving element can, as is known for example from DE 918 042 B, DE 1 932 737 U and DE 197 15 291 C2, also be constructed as the outer ring of a rolling bearing, which is arranged on a crank pin eccentrically secured on the drive shaft and whereof the outer ring is guided in a rollable manner on the sliding block tracks of the sliding block guide.

In contrast, EP 0 389 414 B1 describes a relatively large reciprocating compressor provided for stationary use, having four cylinders which are radially opposite in pairs and pistons which are connected to one another, in which an externally substantially rectangular sliding body in each case is mounted on a crank pin, which is eccentrically secured on the drive shaft, such that it is rotatable with relatively low resistance via a rolling bearing, and is guided in a rollingly displaceable manner between sliding block tracks of the sliding block guide via a linear guide having a rolling body.

Common to the known types of double-piston compressors having sliding block guides is that the two parallel sliding block tracks are of a planar design and are aligned perpendicularly to the longitudinal axis of the piston rod. This construction and arrangement of the sliding block tracks inevitably results in a regular sinusoidal stroke curve of the pistons with an amplitude corresponding to the eccentricity of the crank pin.

SUMMARY

In an embodiment, the present invention provides a two-stage compressor of a compressed air supply device. The two-stage compressor includes a low pressure stage having a low pressure cylinder, a high pressure stage having a high pressure cylinder, a low pressure piston guided in an axially movable manner in the low pressure cylinder, a high pressure piston guided in an axially movable manner in the high pressure cylinder, a piston rod rigidly connecting the low pressure piston and the high pressure piston, and a sliding block guide. The sliding block guide includes a recess arranged in the piston rod and further includes two substantially parallel sliding block tracks. One of the sliding block tracks has an arc-shaped indentation in a central portion. The cylinder of the low pressure stage and the cylinder of the high pressure stage are arranged radially opposite with respect to an axis of rotation of a drive shaft. The low pressure piston and the high pressure piston are connected to the drive shaft via the sliding block guide. The two sliding block tracks are aligned in a plane perpendicular to the axis of rotation of the drive shaft. The drive shaft has a drive interface configured to engage with the recess. The drive interface is arranged axially parallel to the axis of rotation of the drive shaft and is secured on the drive shaft with an eccentricity. The sliding block tracks of the sliding block guide are constructed and arranged such that, during operation of the two-stage compressor, a movement of the low pressure piston and of the high pressure piston follows a piston stroke curve that deviates from a regular sinusoidal stroke curve having an amplitude corresponding to the eccentricity of the drive interface.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 5a is a graph of the stroke curve of the pistons of the double-piston compressor according to FIG. 5;

DETAILED DESCRIPTION

Figure 1:
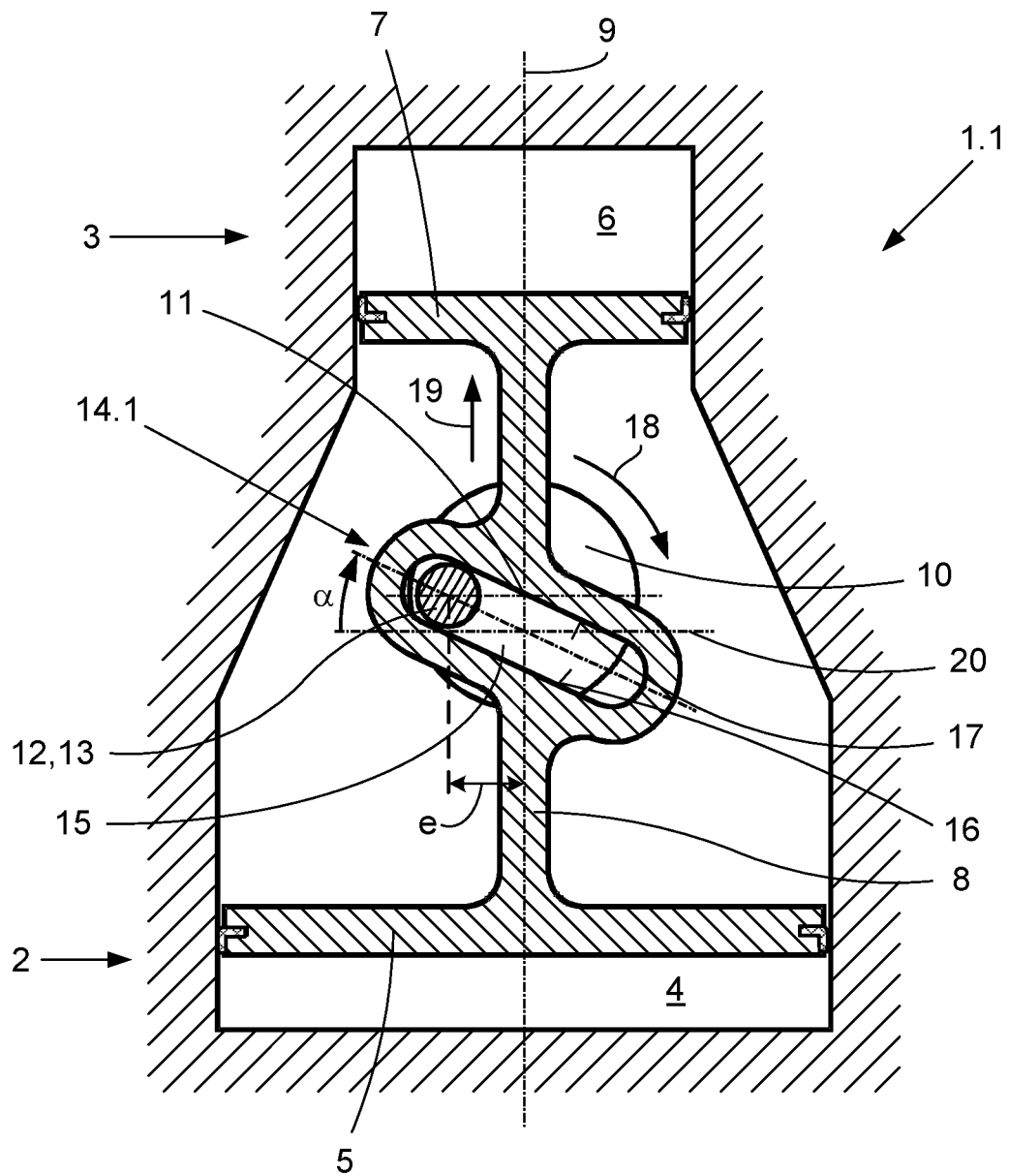
FIG. 1 illustrates a double-piston compressor according to an embodiment of the invention in a schematic cross-sectional view.

Embodiments of the present invention provide a double-piston compressor of a compressed air supply device, having a low pressure stage and a high pressure stage, which each have a cylinder with a piston guided in an axially movable manner therein, wherein the two cylinders are arranged radially opposite with respect to an axis of rotation of a drive shaft, wherein the two pistons are rigidly connected to one another by means of a piston rod, wherein the two pistons are drivingly connected to the drive shaft via a sliding block guide, wherein the sliding block guide has a recess which is arranged in the piston rod, is provided with two parallel sliding block tracks and is aligned perpendicularly to the axis of rotation of the drive shaft, and in which the sliding block guide has a drive element which is in engagement with the recess, is arranged axially parallel with respect to the axis of rotation of the drive shaft and is secured on the drive shaft with an eccentricity.

Embodiments of the present invention provide a double-piston compressor having a sliding block guide of the type mentioned at the outset, which has two parallel sliding block tracks.

A regular sinusoidal stroke curve of pistons can be modified in a desired manner by a suitable alteration to the alignment and/or the contour of the parallel sliding block tracks of the sliding block guide.

Embodiments of the invention therefore provide a double-piston compressor of a compressed air supply device, which has a low pressure stage and a high pressure stage. The two pressure stages each have a cylinder with a piston guided in an axially movable manner therein, wherein the two cylinders are arranged radially opposite with respect to an axis of rotation of a drive shaft. The two pistons are rigidly connected to one another by means of a piston rod and are drivingly connected to the drive shaft via a sliding block guide. The sliding block guide has a recess which is arranged in the piston rod, is provided with two parallel sliding block tracks and is aligned perpendicularly to the axis of rotation of the drive shaft. Moreover, the sliding block guide has a drive element which is in engagement with the recess in the piston rod, is arranged axially parallel with respect to the axis of rotation of the drive shaft and is secured on the drive shaft with an eccentricity.

According to embodiments of the invention, the sliding block tracks of the sliding block guide are constructed and arranged such that, during operation of the double-piston compressor, the movement of the pistons follows a stroke curve which deviates from a regular sinusoidal stroke curve, which has an amplitude corresponding to the eccentricity of the drive element.

A first modification of the sliding block guide provides that the sliding block tracks of the sliding block guide are arranged at an inclination in the direction of rotation of the drive shaft relative to a perpendicular on a longitudinal axis of the piston rod. It is thus achieved that the stroke curve of the pistons is phase-shifted towards late and that the amplitude of the stroke curve is increased beyond the eccentricity of the drive element. In contrast, the stroke width, i.e. the angle of rotation range of the intake and pressure strokes of the pistons, remains unaltered.

An alternative second modification of the sliding block guide provides that the sliding block tracks of the sliding block guide are arranged at an inclination in opposition to the direction of rotation of the drive shaft relative to the perpendicular on the longitudinal axis of the piston rod. It is thus achieved that the stroke curve of the pistons is phase-shifted towards early and that the amplitude of the stroke curve is increased beyond the eccentricity of the drive element. The stroke width of the intake and pressure strokes of the pistons also remains unaltered in this case.

For functional reasons, the angle of inclination of the sliding block tracks relative to the perpendicular on the longitudinal axis of the piston rod, should be a maximum of 45°.

A third modification of the sliding block guide, which can be applied both to a perpendicular and an inclined alignment of the sliding block tracks, provides that at least one of the sliding block tracks of the sliding block guide has a circular-arc-shaped indentation in a central portion. As a result of the indentation, the peak of the stroke curve is capped, or the maximum amplitude is reduced, and the pressure stroke of the piston facing the indentation and the intake stroke of the piston facing away from the indentation are therefore reduced accordingly.

The radius and the depth of the circular-arc-shaped indentation of the at least one sliding block track are dimensioned such that the stroke height of the piston rod when the drive element passes through the indentation is kept constant. With such a geometry of the indentation, it is ensured that the piston rod is not displaced when the drive element passes through the indentation, so that the progression of the stroke curve of the pistons in the relevant portion is linear and not wavy.

A fourth modification of the sliding block guide, which can be applied both to a perpendicular alignment of the sliding block tracks and in combination with the above-mentioned modifications of the sliding block guide, provides that the sliding block tracks of the sliding block guide are curved in the shape of a circular arc in the direction of one of the two pistons. As a result of this modification of the sliding block guide, the stroke width, i.e. the angle of rotation range of the piston rod, during the stroke movement is increased in the direction of the cylinder facing the curvature of the sliding block tracks and the stroke width of the piston rod during the stroke movement is reduced by the same amount in the direction of the cylinder facing away from the curvature of the sliding block tracks.

Figure 5:
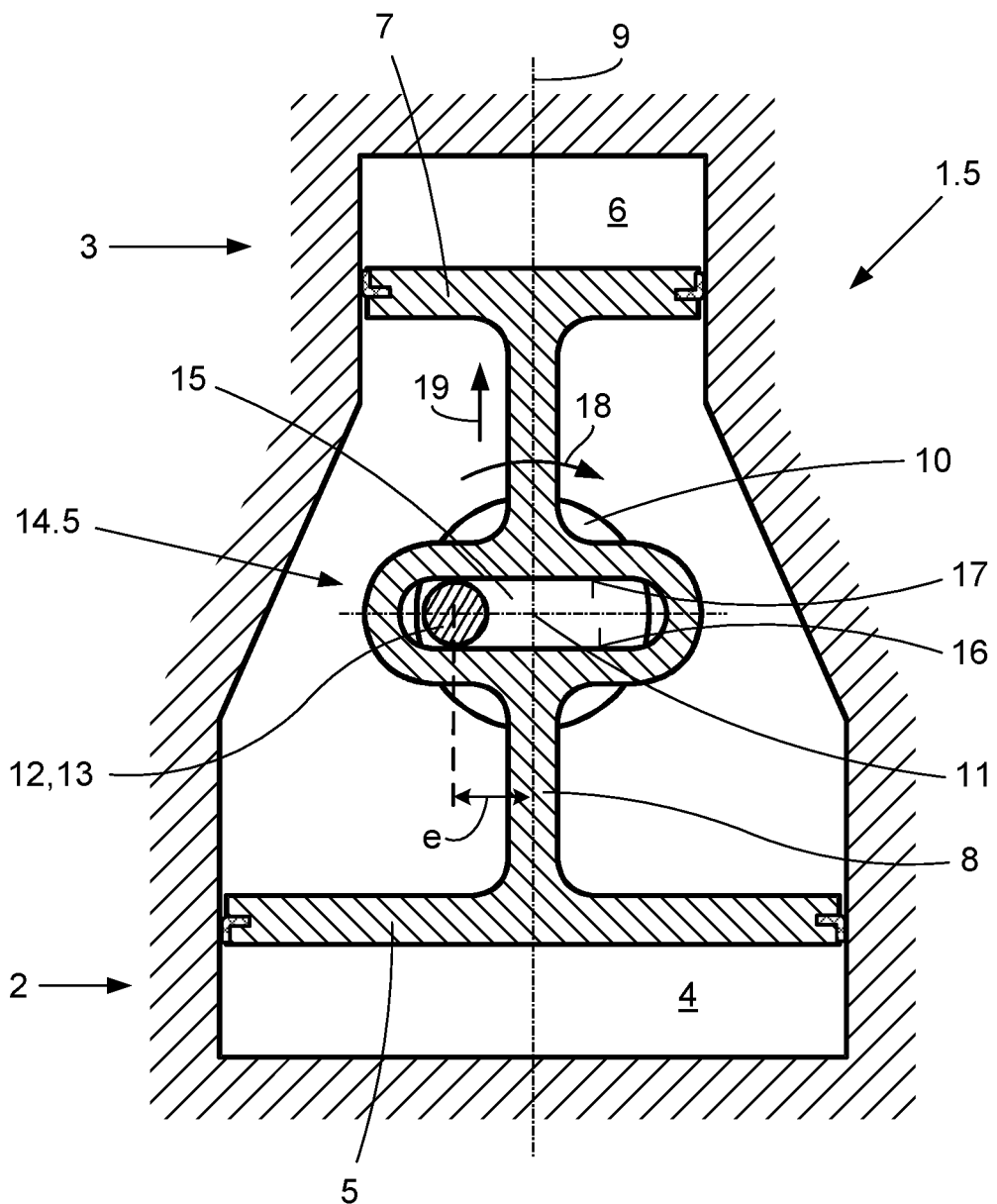
FIG. 5 illustrates a known embodiment of a double-piston compressor in a schematic cross-sectional view.

An embodiment, known per se, of a double-piston compressor 1.5 of a compressed air supply device is shown in FIG. 5 in a schematic cross-sectional view. The double-piston compressor 1.5 has a low pressure stage 2 and a high pressure stage 3 which each comprise a cylinder 4, 6 with a piston 5, 7 guided in an axially movable manner therein. The two cylinders 4, 6 are arranged radially opposite in a housing with respect to an axis of rotation 11 of a drive shaft 10. The two pistons 5, 7 are rigidly connected to one another via a piston rod 8 and are drivingly connected to the drive shaft 10 via a sliding block guide 14.5. The sliding block guide 14.5 comprises a recess 15, which is constructed in the piston rod 8, is provided with two parallel sliding block tracks 16, 17 and is aligned perpendicularly to the axis of rotation 11 of the drive shaft 10, and a drive element 12 which is in engagement with the recess 15 and is eccentrically secured on the drive shaft 10 such that it is axially parallel with respect to the axis of rotation 11 of the drive shaft 10. The two sliding block tracks 16, 17 here are aligned perpendicularly to a longitudinal axis 9 of the piston rod 8. By way of example, the drive element 12 is formed by a crank pin 13 which is secured on the drive shaft 10 such that it is radially spaced from the axis of rotation 11 by the amount of an eccentricity e and is guided in a directly slideable manner on the parallel sliding block tracks 16, 17 of the sliding block guide 14.5.

In FIG. 5a, a stroke curve $Z_H(\phi)\_1.5$ illustrates the movement of the pistons 5, 7 or the piston rod 8 of the known double-piston compressor 1.5 during a revolution of the drive shaft 10. The angle of rotation of the drive shaft 10 here is denoted by $\phi$, the direction of rotation of the drive shaft 10 is assumed to be clockwise according to the direction of rotation arrow 18 shown in FIG. 5, the 0° position of the drive shaft 10 or the crank pin 13 corresponds to the position shown in FIG. 5, the stroke height of the pistons 5, 7 is denoted by $Z_H$ and the stroke direction of the pistons 5, 7 is assumed to be positive according to the stroke direction arrow 19, shown in FIG. 5, in the direction of the cylinder 6 of the high pressure stage 3. The stroke curve $Z_H(\phi)$ of the pistons 5, 7, which is shown in the graph of FIG. 5a, has a regular sinusoidal progression with the amplitude which corresponds to the eccentricity e of the crank pin 13. The progression of this stroke curve can then be expressed as $Z_H(\phi)=e*\sin(\phi)$.

FIG. 1 illustrates a double-piston compressor 1.1 of a compressed air supply device according to a first embodiment in a schematic cross-sectional view, which differs from the embodiment of the double-piston compressor 1.5 according to FIG. 5 due to an altered arrangement of the sliding block guide 14.1. In this case, the recess 15 with the two parallel sliding block tracks 16, 17 is arranged pivoted relative to a perpendicular 20 located on the longitudinal axis 9 of the piston rod 8 through an angle of inclination of $\alpha=25°$ here in the direction of rotation 18 of the drive shaft 10.

Figure 1A:
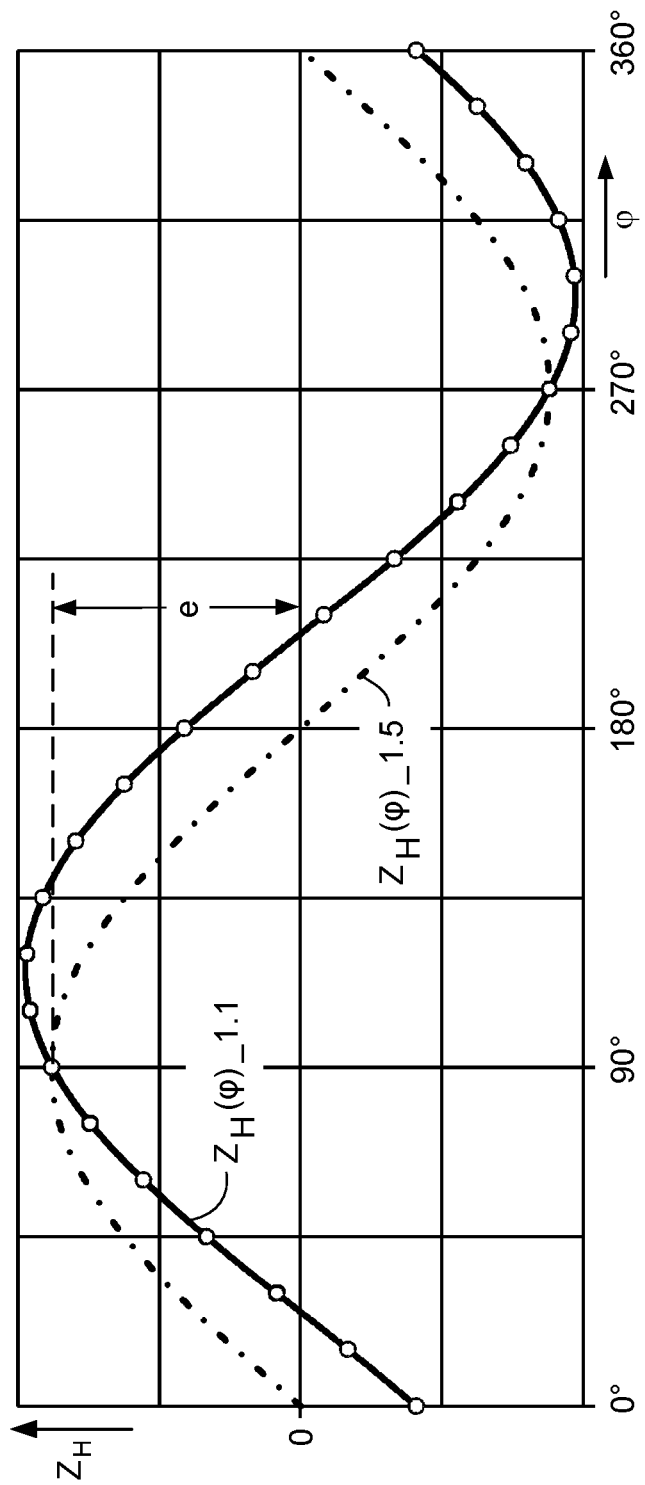
FIG. 1a is a graph of the stroke curve of the pistons of the double-piston compressor according to FIG. 1 in a graph.

The stroke curve $Z_H(\phi)\_1.1$, shown in the graph of FIG. 1a, of the pistons 5, 7 or the piston rod 8 of the double-piston compressor 1.1 likewise has a regular sinusoidal progression. However, owing to the inclined arrangement of the sliding block tracks 16, 17 in the direction of rotation 18 of the drive shaft 10, the stroke curve $Z_H(\phi)\_1.1$ has a phase shift towards late and a stroke height exceeding the eccentricity e of the crank pin 13. The progression of the stroke curve $Z_H(\phi)\_1.1$ of the pistons 5, 7 of the double-piston compressor 1.1 can be expressed by the formula $Z_H(\phi)=e*(\sin(\phi)-\cos(\phi)*\tan(\alpha))$. For comparison, in FIG. 1, the stroke curve $Z_H(\phi)\_1.5$ of the pistons 5, 7 of the double-piston compressor 1.5 according to FIG. 5 is also shown as a dot-and-dash curve.

Figure 2:
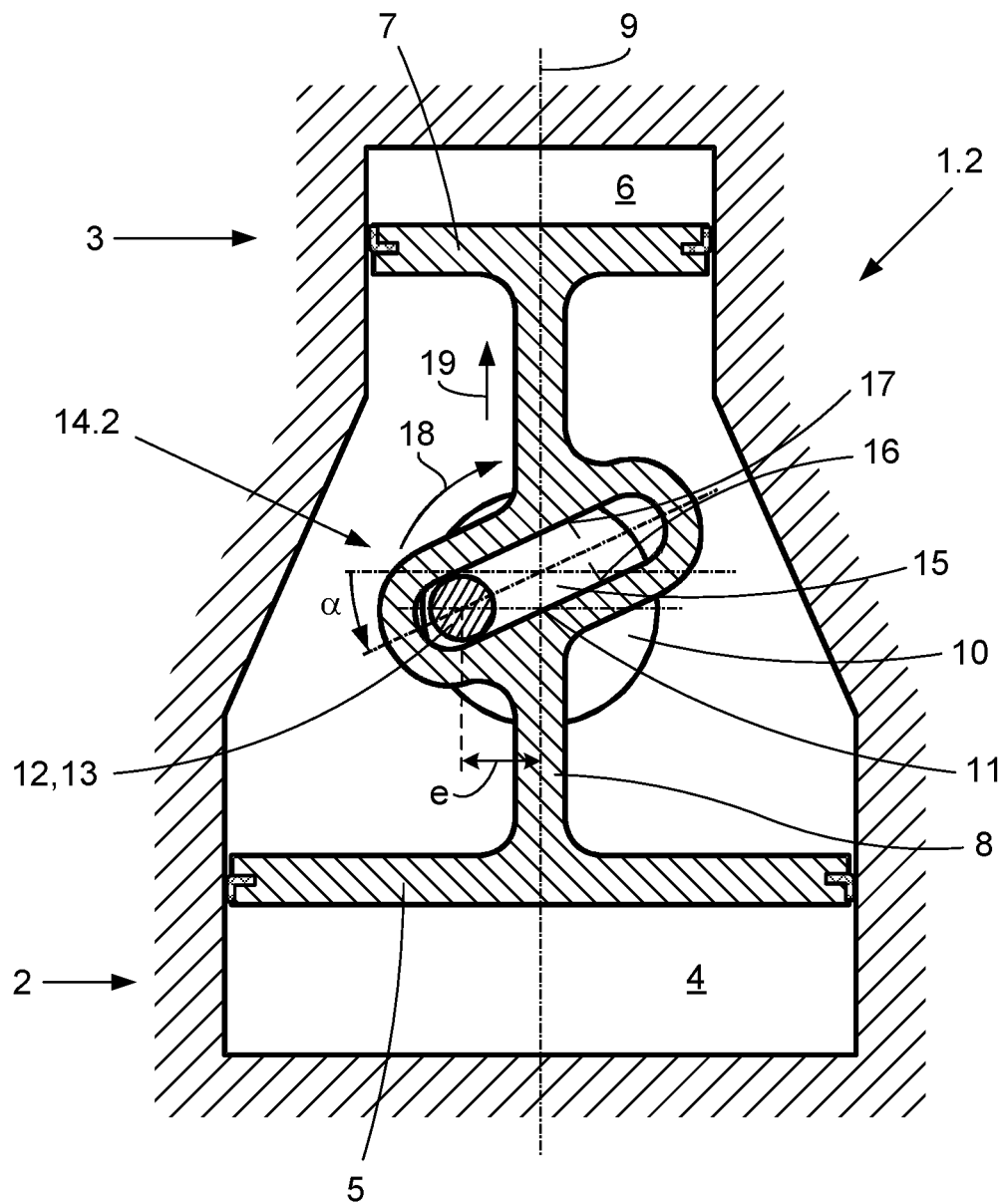
FIG. 2 illustrates a double-piston compressor according to a second embodiment of the invention in a schematic cross-sectional view.

FIG. 2 illustrates a double-piston compressor 1.2 of a compressed air supply device according to a second embodiment of the invention in a schematic cross-sectional view, which differs from the embodiment of the double-piston compressor 1.5 according to FIG. 5 due to a differently altered arrangement of the sliding block guide 14.2. The recess 15 with the two parallel sliding block tracks 16, 17 is now arranged pivoted relative to the perpendicular 20 located on the longitudinal axis 9 of the piston rod 8 through an angle of inclination of $\alpha=-25°$ here in opposition to the direction of rotation 18 of the drive shaft 10.

Figure 2A:
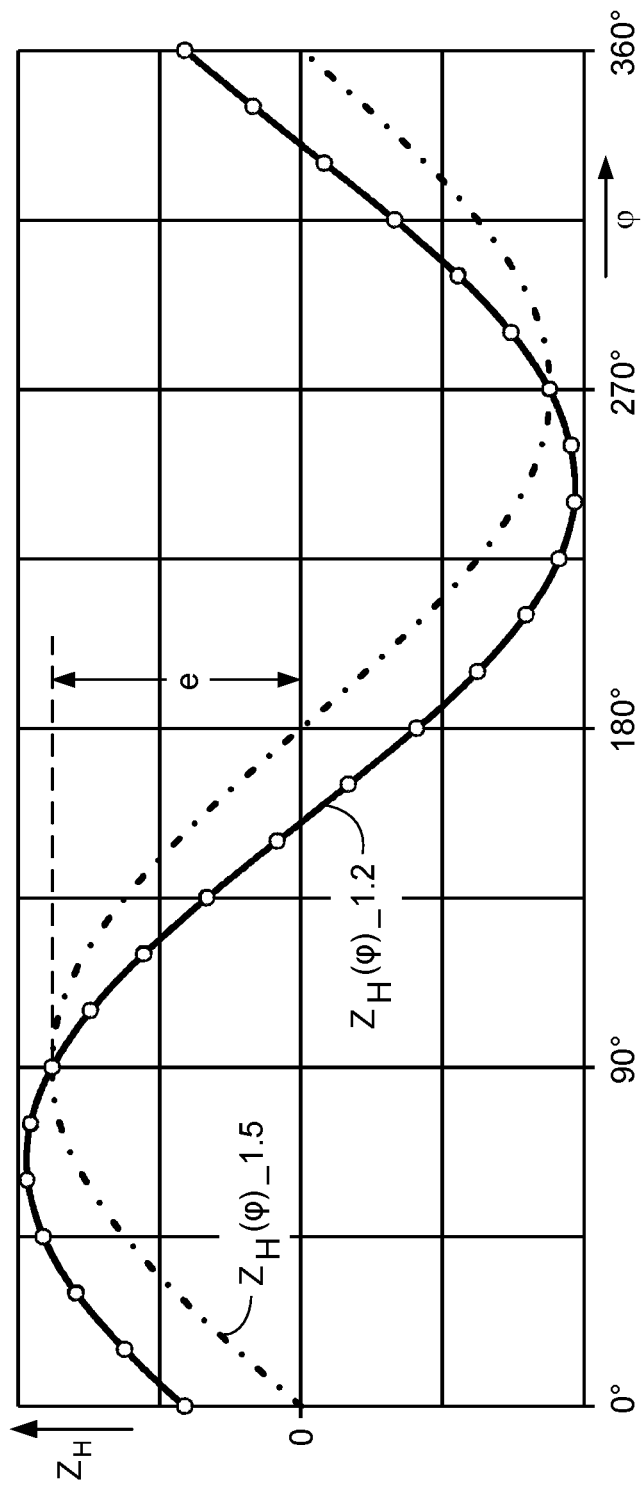
FIG. 2a is a graph of the stroke curve of the pistons of the double-piston compressor according to FIG. 2.

The stroke curve $Z_H(\phi)\_1.2$, shown in the graph of FIG. 2a, of the pistons 5, 7 or the piston rod 8 of the double-piston compressor 1.2 in turn has a regular sinusoidal progression which, owing to the inclined arrangement of the sliding block tracks 16, 17 in opposition to the direction of rotation 18 of the drive shaft 10, now has a phase shift towards early and likewise a stroke height exceeding the eccentricity e of the crank pin 13. Taking the minus sign of the angle of inclination a into account, the progression of the stroke curve $Z_H(\phi)\_1.2$ of the pistons 5, 7 of the double-piston compressor 1.2 can likewise be expressed by the formula $Z_H(\phi)=e*(\sin(\phi)-\cos(\phi)*\tan(\alpha))$, For comparison, in FIG. 2, the stroke curve $Z_H(\phi)\_1.5$ of the pistons 5, 7 of the double-piston compressor 1.5 according to FIG. 5 is also shown as a dot-and-dash curve.

Figure 3:
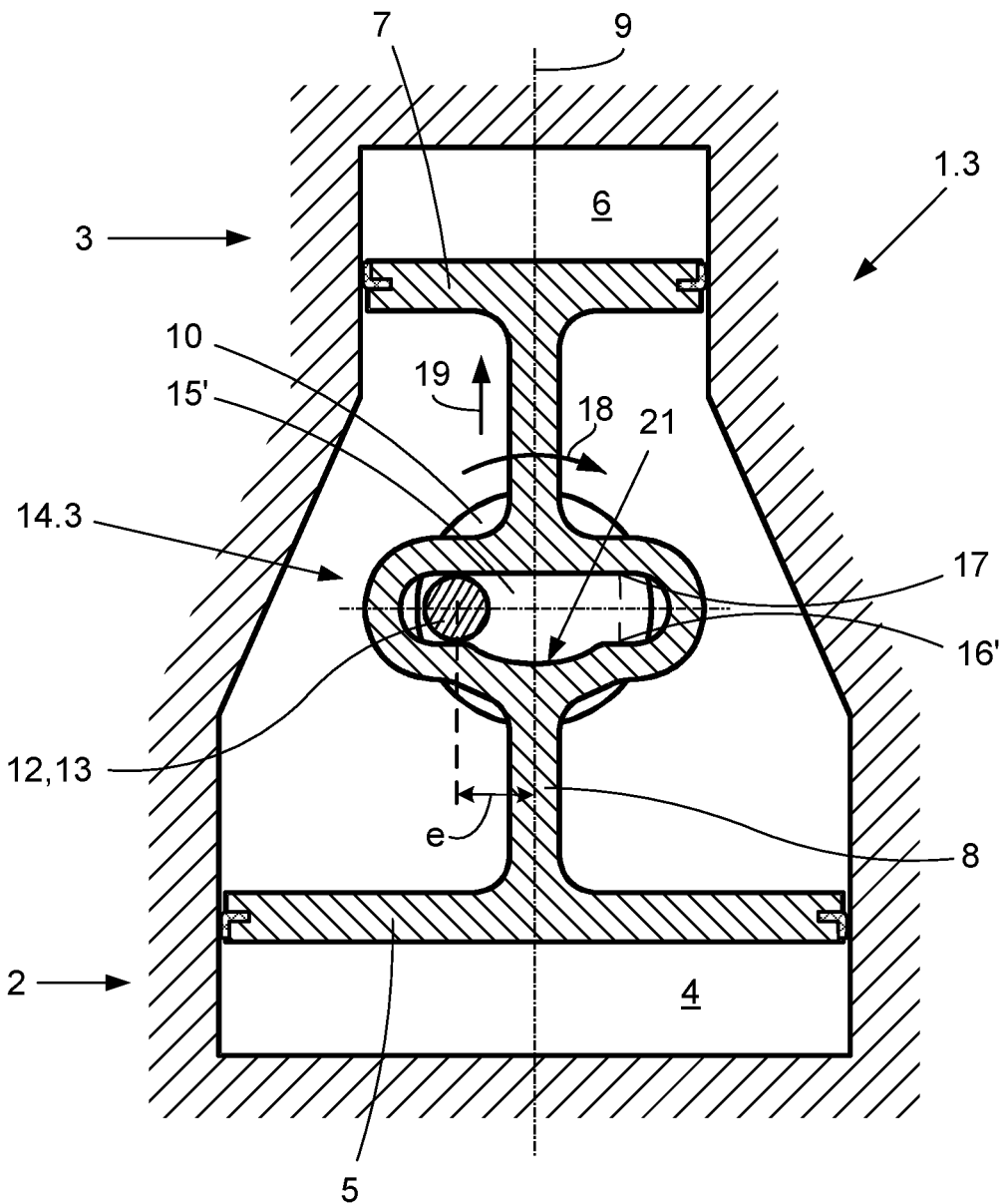
FIG. 3 illustrates a double-piston compressor according to a third embodiment of the invention in a schematic cross-sectional view.

FIG. 3 illustrates a double-piston compressor 1.3 of a compressed air supply device according to a third embodiment of the invention in a schematic cross-sectional view, which differs from the embodiment of the double-piston compressor 1.5 according to FIG. 5 due to a geometrically altered construction of the sliding block guide 14.3. By way of example, the sliding block track 16' of the sliding block guide 14.3 which faces the piston 5 of the lower pressure stage 2 now has, in the region of the recess 15', a circular-arc-shaped indentation 21 in a central portion. The radius and the depth of the circular-arc-shaped indentation 21 are dimensioned such that the stroke height $Z_H$ of the piston rod 8 when the crank pin 13 passes through the indentation 21 is held constant.

Figure 3A:
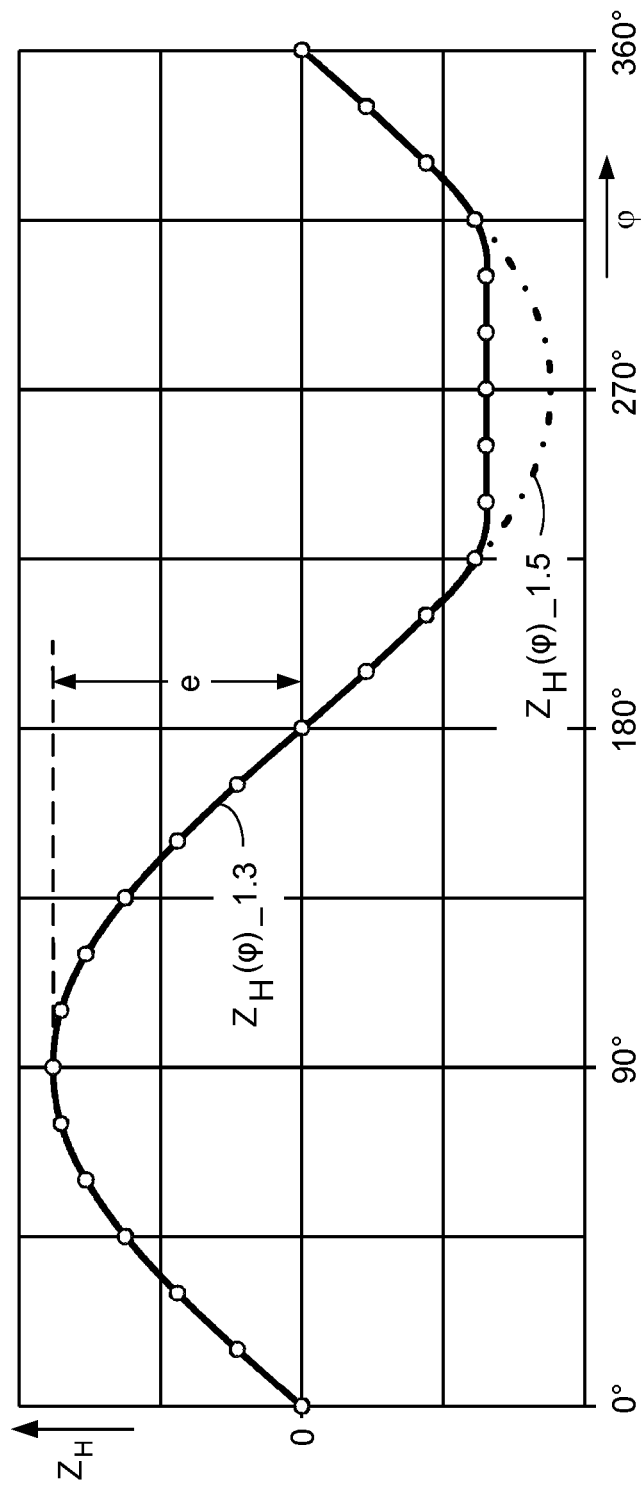
FIG. 3a is a graph of the stroke curve of the pistons of the double-piston compressor according to FIG. 3.

In the first half-section of 0° to 180°, which forms the intake stroke of the piston 5 of the low pressure stage 2 and the pressure stroke of the piston 7 of the high pressure stage 3, the stroke curve $Z_H(\phi)\_1.3$, shown in the graph of FIG. 3a, of the pistons 5, 7 or the piston rod 8 is identical to the stroke curve $Z_H(\phi)\_1.5$ of the pistons 5, 7 of the double-piston compressor 1.5 according to FIG. 5. In contrast, in the second half-section of the stroke curve $Z_H(\phi)\_1.3$ of >180° to <360°, which forms the pressure stroke of the piston 5 of the low pressure stage 2 and the intake stroke of the piston 7 of the high pressure stage 3, the peak of the stroke curve $Z_H(\phi)\_1.3$ is capped, so that the pressure stroke of the piston 5 of the low pressure stage 2 and the intake stroke of the piston 7 of the high pressure stage 3 are reduced in relation to the stroke height produced by the eccentricity 3 of the crank pin in the double-piston compressor 1.5 according to FIG. 5. For comparison, in FIG. 3, the stroke curve $Z_H(\phi)\_1.5$ of the pistons 5, 7 of the double-piston compressor 1.5 according to FIG. 5 is likewise shown as a dot-and-dash curve.

Figure 4:
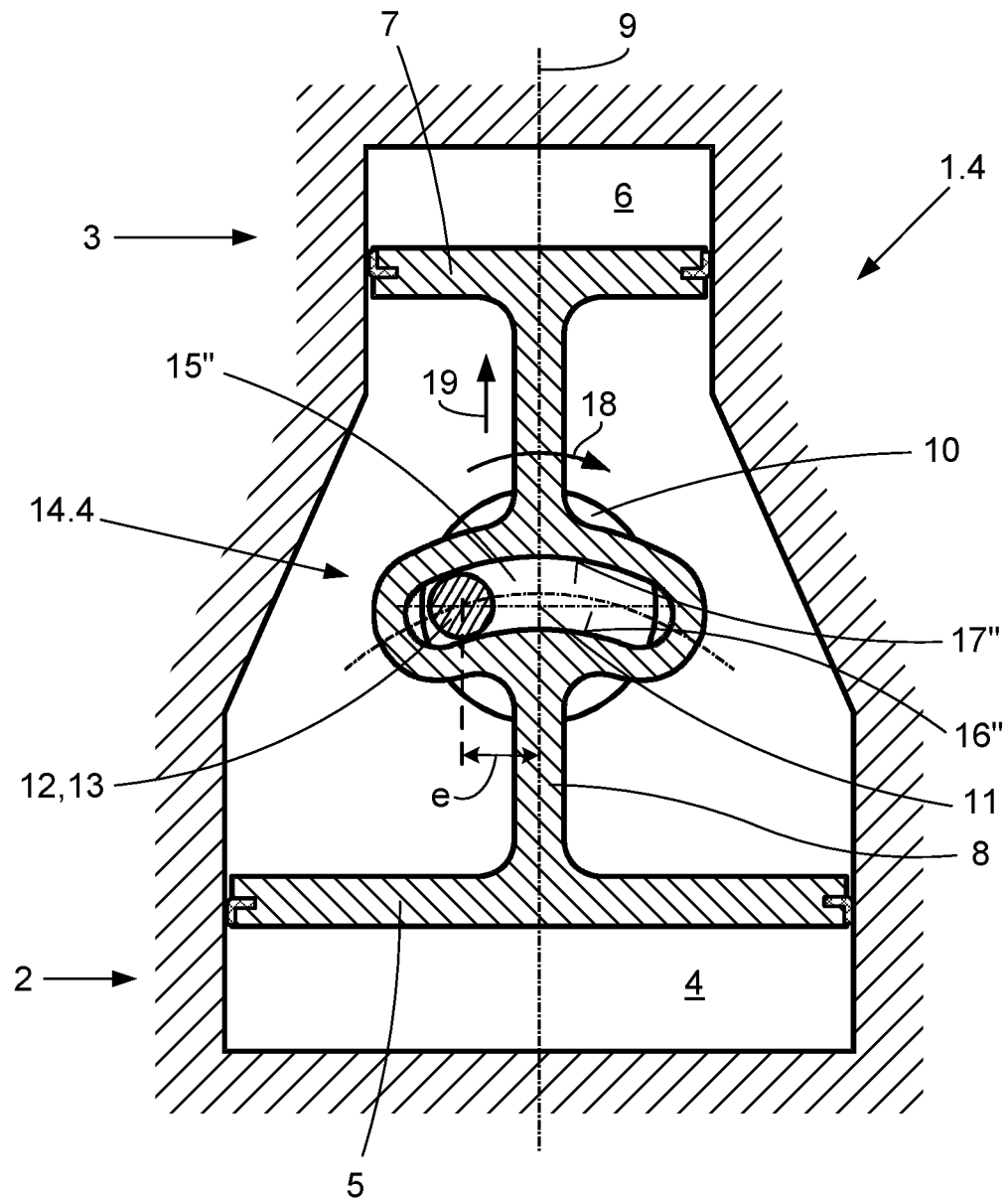
FIG. 4 illustrates a double-piston compressor according to a fourth embodiment of the invention in a schematic cross-sectional view.

FIG. 4 illustrates a double-piston compressor 1.4 of a compressed air supply device according to a fourth embodiment of the invention in a schematic cross-sectional view, which differs from the embodiment of the double-piston compressor 1.5 according to FIG. 5 due to a different geometrically altered construction of the sliding block guide 14.4. By way of example, in the region of the recess 15", the two sliding block tracks 16", 17" of the sliding block guide 14.4 are now designed to be curved in the shape of a circular arc in the direction of the piston 7 of the high pressure stage 3.

Figure 4A:
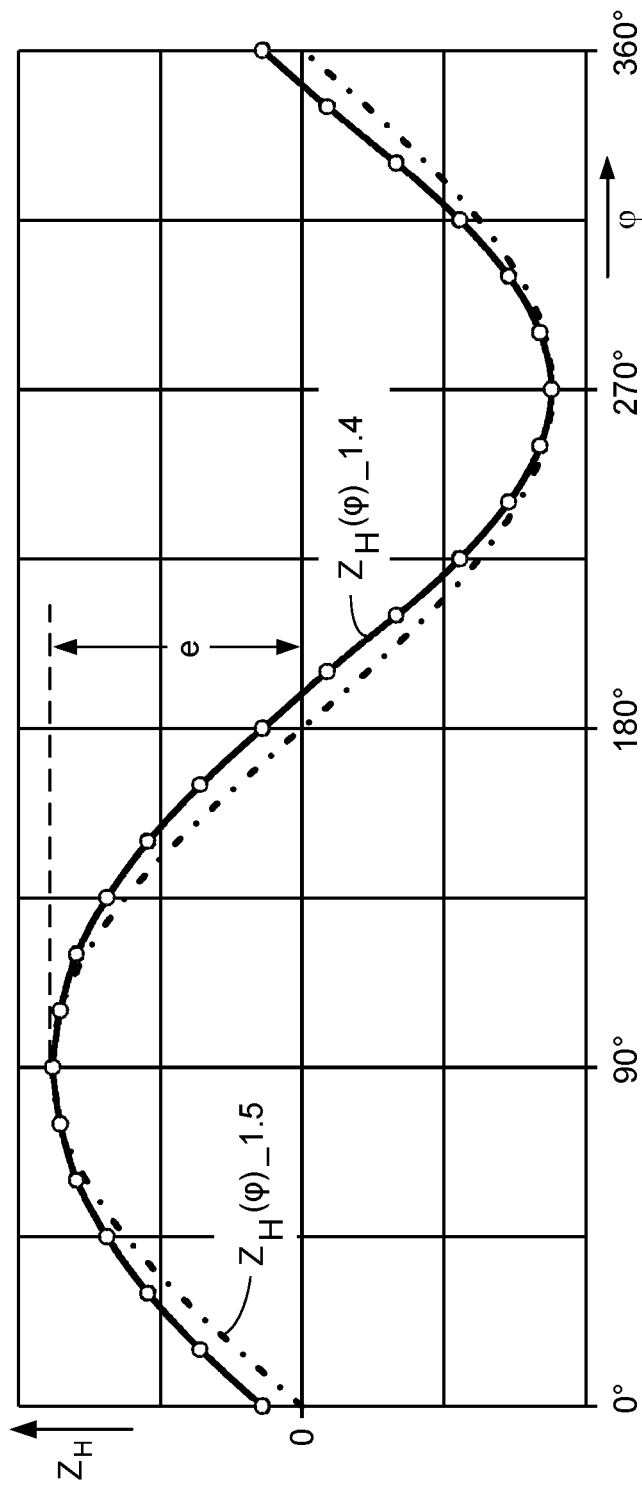
FIG. 4a is a graph of the stroke curve of the pistons of the double-piston compressor according to FIG. 4.

As can be seen from the stroke curve $Z_H(\phi)\_1.4$, shown in the graph of FIG. 4a, of the pistons 5, 7 or the piston rod 8 of the double-piston compressor 1.4, this modification of the sliding block guide 14.4 results in the stroke width, i.e. the angle of rotation range of the piston rod 8, during the stroke movement increasing in the direction of the cylinder 6 of the high pressure stage 3, which faces the curvature of the sliding block tracks 16", 17", and the stroke width of the piston rod 8 during the stroke movement reducing by the same amount in the direction of the cylinder 5 of the low pressure stage 2, which faces away from the curvature of the sliding block tracks 16", 17". In contrast, the phase position and the stroke height of the stroke curve $Z_H(\phi)\_1.4$ of the pistons 5, 7 of the double-piston compressor 1.4 remain unaltered. For comparison, in FIG. 4, the stroke curve $Z_H(\phi)\_1.5$ of the pistons 5, 7 of the double-piston compressor 1.5 according to FIG. 5 is in turn shown as a dot-and-dash curve.

With reference to the example of the known sliding block guide 14.5 of the double-piston compressor 1.5 according to FIG. 5, FIGS. 6a to 6d, described below, show a detailed cross-sectional view of possible embodiments of the drive element 12.

Figure 6A:
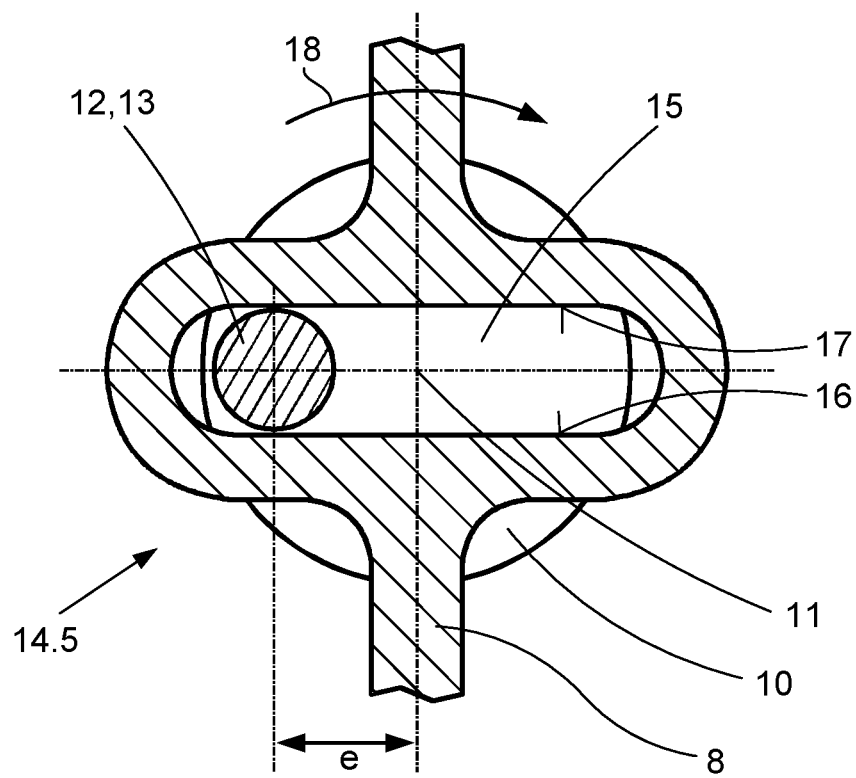
FIG. 6a is a detailed cross-sectional view of a first embodiment of a drive element of a sliding block guide of the double-piston compressors according to FIGS. 1 to 5.

In the first embodiment shown in FIG. 6a, the drive element 12 is constructed as a crank pin 13 which is secured on the drive shaft 10 such that it is radially spaced form the axis of rotation 11 by the eccentricity e and is guided in a directly slideable manner on the parallel sliding block tracks 16, 17 of the sliding block guide 14.5. This embodiment of the drive element 12 has been used by way of example in the drawings of the embodiments of the double-piston compressor 1.1-1.5 in FIGS. 1 to 5. The crank pin 13 is clearly arranged with play in the recess 15 of the piston rod 8.

Figure 6B:
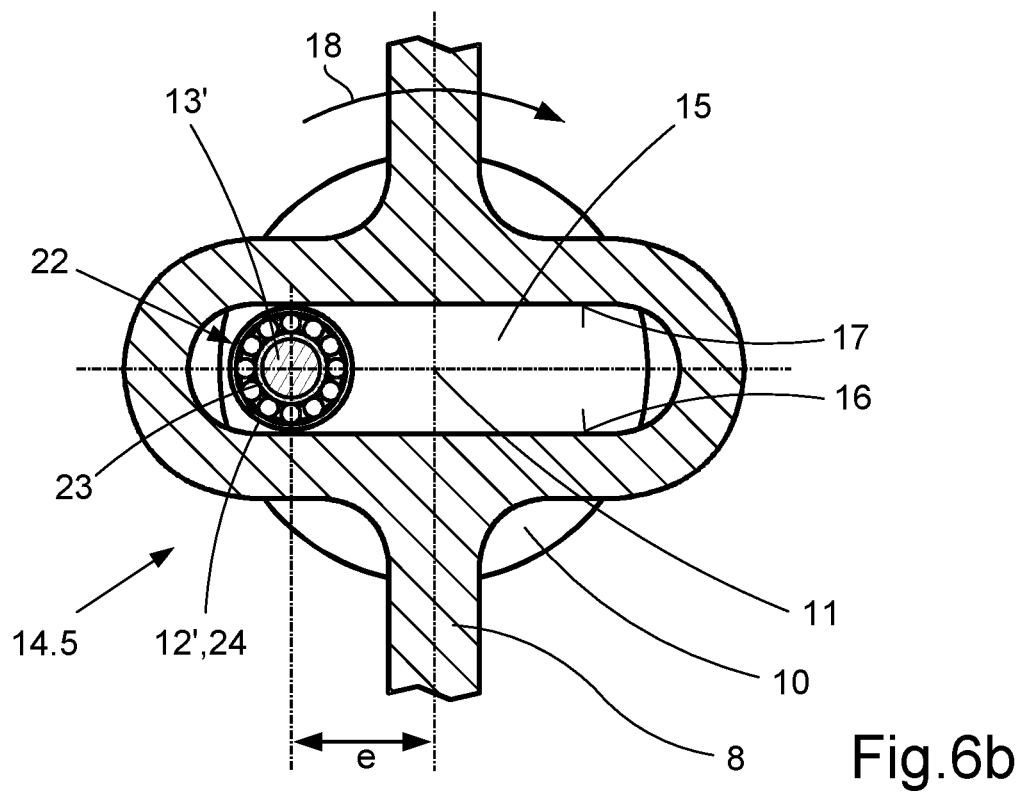
FIG. 6b is a detailed cross-sectional view of a second embodiment of the drive element of a sliding block guide of the double-piston compressors according to FIGS. 1 to 5.

According to the second embodiment shown in FIG. 6b, the drive element 12' is formed by the outer ring 24 of a rolling bearing 22. The rolling bearing 22 is arranged with its inner ring 23 on a crank pin 13' which is secured on the drive shaft 10 such that it is radially spaced from the axis of rotation 11 by eccentricity e. The outer ring 24 of the rolling bearing 22 is rollably guided on the parallel sliding block tracks 16, 17 of the sliding block guide 14.5. With this embodiment of the drive element 12', the resistance and wear of the sliding block guide 14.5 is clearly lower than with the embodiment of the drive element 12 according to FIG. 6a.

Figure 6C:
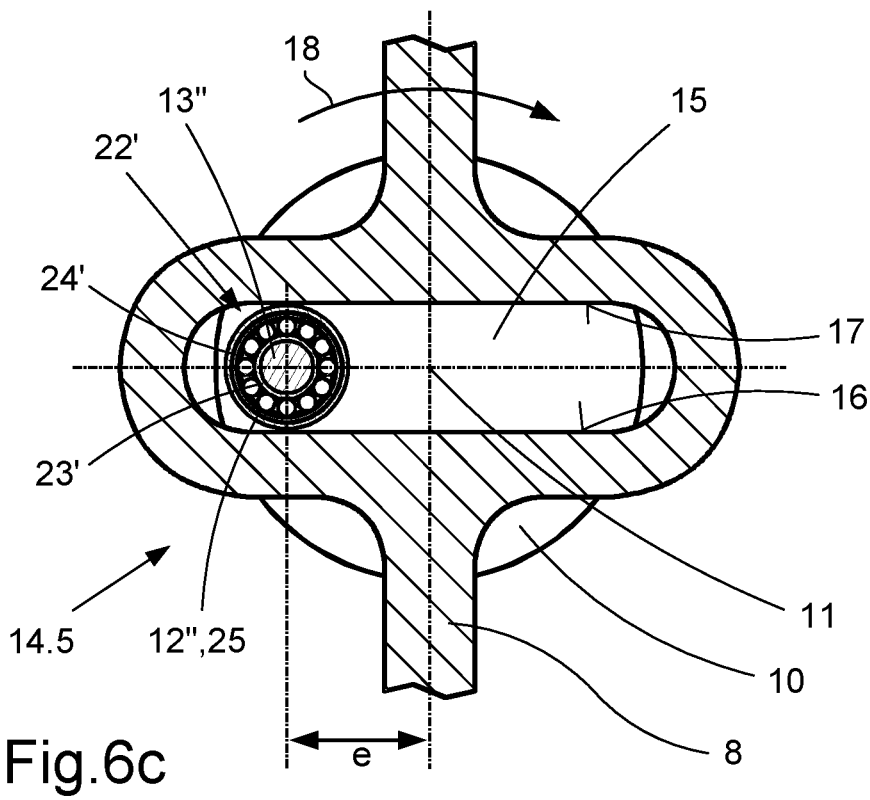
FIG. 6c is a detailed cross-sectional view of a third embodiment of the drive element of a sliding block guide of the double-piston compressors according to FIGS. 1 to 5.

In a third embodiment shown in FIG. 6c, the drive element 12" is formed by a slide bearing ring 25 which is slide-mounted on the outer ring 24' of a rolling bearing 22'. The rolling bearing 22' is arranged with its inner ring 23' on a crank pin 13', which is secured on the drive shaft 10 such that it is radially spaced from the axis of rotation 11 by the eccentricity e. The slide bearing ring 25 is rollably guided on the parallel sliding block tracks 16, 17 of the sliding block guide 14.5. With this embodiment of the drive element 12", the resistance and wear of the sliding block guide 14.5 is again lower than with the embodiment of the drive element 12' according to FIG. 6b.

Figure 6D:
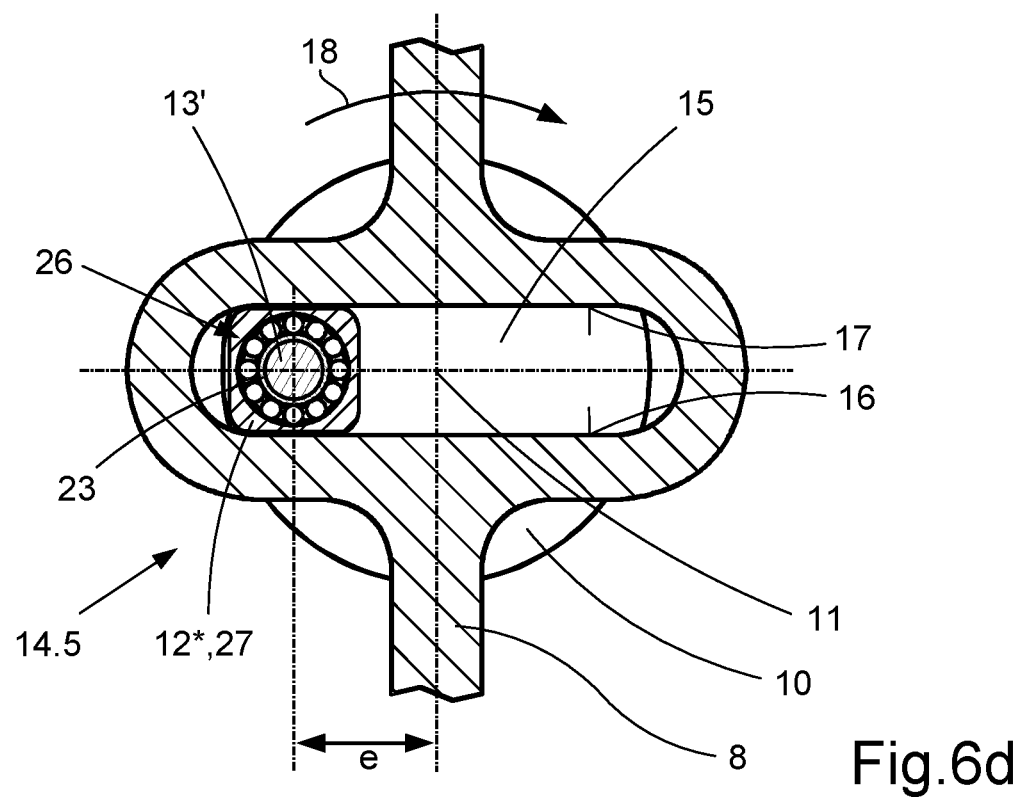
FIG. 6d is a detailed cross-sectional view of a fourth embodiment of the drive element of a sliding block guide of the double-piston compressors according to FIGS. 1 to 5.

In a fourth embodiment shown in FIG. 6d, the drive element 12* is formed by an externally substantially rectangular slide body 27, which is rotatably mounted on a crank pin 13' via a rolling bearing 26. The crank pin 13' is secured on the drive shaft 10 such that it is radially spaced from the axis of rotation 11 by the eccentricity e. The slide body 27 is slideably guided on the parallel sliding block tracks 16, 17 of the sliding block guide 14.5. Owing to the low surface pressure between the slide body 27 and the sliding block tracks 16, 17, the resistance and wear of the sliding block guide 14.5 in this embodiment of the drive element 12* is also relatively low.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS 1.1 Double-piston compressor, first embodiment
1.2 Double-piston compressor, second embodiment 1.3 Double-piston compressor, third embodiment
1.4 Double-piston compressor, fourth embodiment
1.5 Double-piston compressor, known embodiment
2 Low pressure stage
3 High pressure stage
4 Cylinder
5 Piston
6 Cylinder
7 Piston
8 Piston rod
9 Longitudinal axis of the piston rod
10 Drive shaft
11 Axis of rotation of the drive shaft
12 Drive element
12', 12" Drive element
12* Drive element
13 Crank pin
13', 13" Crank pin
14.1 Sliding block guide, first embodiment
14.2 Sliding block guide, second embodiment
14.3 Sliding block guide, third embodiment
14.4 Sliding block guide, fourth embodiment
14.5 Sliding block guide, known embodiment
15 Recess
15' Recess
15" Recess
16 First sliding block track
16' First sliding block track
16" First sliding block track
17 Second sliding block track
17" Second sliding block track
18 Direction-of-rotation arrow, direction of rotation
19 Stroke-direction arrow, stroke direction
20 Perpendicular
21 Indentation of the first sliding block track 16'
22, 22' Rolling bearing
23, 23' Inner ring
24, 24' Outer ring
25 Slide bearing ring
26 Rolling bearing
27 Slide body
e Eccentricity
$Z_H$ Stroke height
$Z_H(\phi)\_1.1$ Stroke curve
$Z_H(\phi)\_1.2$ Stroke curve
$Z_H(\phi)\_1.3$ Stroke curve
$Z_H(\phi)\_1.4$ Stroke curve
$Z_H(\phi)\_1.5$ Stroke curve
∝ Angle of inclination
tan(∝) Tangent of the angle of inclination
φ Angle of rotation
sin(φ) Sinus of the angle of rotation
cos(φ) Cosine of the angle of rotation

What is claimed is:

1. A two-stage compressor of a compressed air supply device, the two-stage compressor comprising:
    a low pressure stage having a low pressure cylinder;
    a high pressure stage having a high pressure cylinder;
    a low pressure piston guided in an axially movable manner in the low pressure cylinder;
    a high pressure piston guided in an axially movable manner in the high pressure cylinder;
    a piston rod rigidly connecting the low pressure piston and the high pressure piston; and
    a sliding block guide, the sliding block guide having a recess arranged in the piston rod, the sliding block guide having two substantially parallel sliding block tracks, one of the sliding block tracks having an arc-shaped indentation in a central portion,
    wherein the cylinder of the low pressure stage and the cylinder of the high pressure stage are arranged radially opposite with respect to an axis of rotation of a drive shaft,
    wherein the low pressure piston and the high pressure piston are connected to the drive shaft via the sliding block guide,
    wherein the two sliding block tracks are aligned in a plane perpendicular to the axis of rotation of the drive shaft,
    wherein the drive shaft has a drive interface configured to engage with the recess, an axis of the drive interface being arranged axially parallel to the axis of rotation of the drive shaft, the drive interface being secured on the drive shaft with an eccentricity, and
    wherein the sliding block tracks of the sliding block guide are constructed and arranged such that, during operation of the two-stage compressor, a movement of the low pressure piston and of the high pressure piston follows a piston stroke curve that deviates from a regular sinusoidal stroke curve having an amplitude corresponding to the eccentricity of the drive interface.

2. The two-stage compressor as claimed in claim 1, wherein the arc-shaped indentation is a circular-arc-shaped indentation.

3. The two-stage compressor as claimed in claim 2, wherein a radius and a depth of the circular-arc-shaped indentation are dimensioned such that a stroke height of the piston rod when the drive interface passes through the indentation is kept constant.

4. The two-stage compressor as claimed in claim 1, wherein the drive interface includes a crank pin, the crank pin being secured on the drive shaft at a position radially spaced by the eccentricity from the axis of rotation of the drive shaft.

5. The two-stage compressor as claimed in claim 4, wherein the drive interface further includes a rolling bearing having an inner ring and an outer ring, the inner ring of the rolling bearing lying on the crank pin and the outer ring of the rolling bearing rollably guided on the two parallel sliding block tracks.

6. The two-stage compressor as claimed in claim 4, wherein the drive interface further includes a rolling bearing and a slide bearing ring,
    wherein the rolling bearing has an inner ring and an outer ring, the inner ring of the rolling bearing lying on the crank pin and the outer ring of the rolling bearing lying against an interior of the slide bearing ring, and
    wherein the slide bearing ring has an exterior surface that is guided on the two parallel sliding block tracks.

7. The two-stage compressor as claimed in claim 1, wherein the piston stroke curve and the regular sinusoidal stroke curve have a same stroke width.

8. The two-stage compressor as claimed in claim 1, wherein the amplitude of the piston stroke curve corresponds to a stroke height of the low pressure piston and of the high pressure piston.

9. The two-stage compressor as claimed in claim 1, wherein, in the central portion, the sliding block track having the arc-shaped indentation in the central portion is not linear to the other sliding block track of the two sliding block tracks.

10. The two-stage compressor as claimed in claim 9, wherein the other of the two sliding block tracks includes a linear portion, the linear portion having a length of at least twice the eccentricity and at most a maximum length of the recess.

11. The two-stage compressor as claimed in claim 1, wherein only one of the sliding block tracks has an arc-shaped indentation in a central portion.

12. The two-stage compressor as claimed in claim 11, wherein each of the sliding block tracks have a straight portion, the straight portion of one of the sliding block tracks being parallel to the straight portion of the other of the sliding block tracks.

13. The two-stage compressor as claimed in claim 1, wherein the movement of the low pressure piston and of the high pressure piston follows a piston stroke curve that deviates from the regular sinusoidal stroke curve in that it includes a reduced amplitude in at least one stroke of each of the pistons.

14. The two-stage compressor as claimed in claim 13, wherein the piston stroke curve that deviates from the regular sinusoidal stroke curve has a constant displacement value over an interval of rotation of the drive shaft.

* * * * *